United States Patent [19]

Martin

[11] Patent Number: 5,245,730
[45] Date of Patent: Sep. 21, 1993

[54] ROPE CONNECTOR HAVING QUICK ENGAGING AND RELEASING MEANS

[76] Inventor: Horace J. Martin, 2095 Sunset Point Rd., Unit 2002, Clearwater, Fla. 34625

[21] Appl. No.: 929,634

[22] Filed: Aug. 12, 1992

[51] Int. Cl.$^5$ .............................................. F16G 11/00
[52] U.S. Cl. ................................ 24/132 R; 24/129 R; 24/543
[58] Field of Search ................... 24/339, 115 R, 335, 24/132 R, 129 R, 132 WL, 543, 518, 487

[56] References Cited

U.S. PATENT DOCUMENTS

| | | | |
|---|---|---|---|
| 3,459,397 | 8/1969 | Hedberg | 24/115 R X |
| 4,020,277 | 4/1977 | La Chance, Sr. et al. | 24/132 R X |
| 4,236,281 | 12/1980 | Bottum | 24/132 R X |
| 4,594,752 | 6/1986 | Garner, Sr. | 24/132 R |

FOREIGN PATENT DOCUMENTS

| | | | |
|---|---|---|---|
| 56544 | 8/1939 | Denmark | 24/339 |
| 663592 | 7/1938 | Fed. Rep. of Germany | 24/132 WL |

Primary Examiner—James R. Brittain
Attorney, Agent, or Firm—Joseph C. Mason, Jr.; Ronald E. Smith

[57] ABSTRACT

A rope clamp has a base and a pair of caps hingedly connected to opposite sides of the base. A longitudinally extending, rope-receiving groove is formed in each side of the base, and a similar groove is formed in each cap so that a pair of longitudinally extending, rope-receiving cylindrical bores are formed between the base and caps when the caps are closed. Upstanding spikes are positioned in each groove so that a rope in a bore is engaged by the spikes in the groove formed in the base when the caps are opened, and is further engaged by the spikes in the caps when the caps are closed. Each cap is independently hingedly mounted to the base so that one cap may be open when the other cap is closed. A catch member is secured to the base, and has teeth formed in free ends that extend in opposite directions relative to the base. Complementally formed teeth are formed in an outer surface of each cap, and these teeth engage one another when the caps are closed. The spikes associated with the grooves formed in the base are positioned on an insert member that is removably received within an insert-receiving opening formed in the base. An insert having a thicker base is inserted into the cavity when a rope of smaller diameter is to be engaged. The insert member is eliminated in a second embodiment and the spikes are eliminated in a third embodiment.

7 Claims, 2 Drawing Sheets

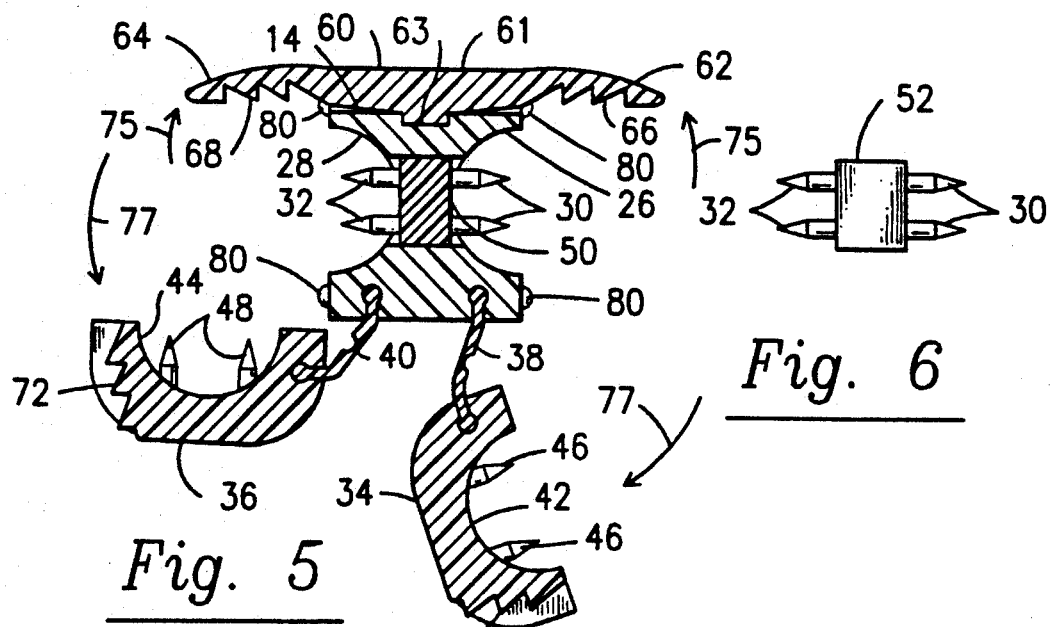
Fig. 5
Fig. 6
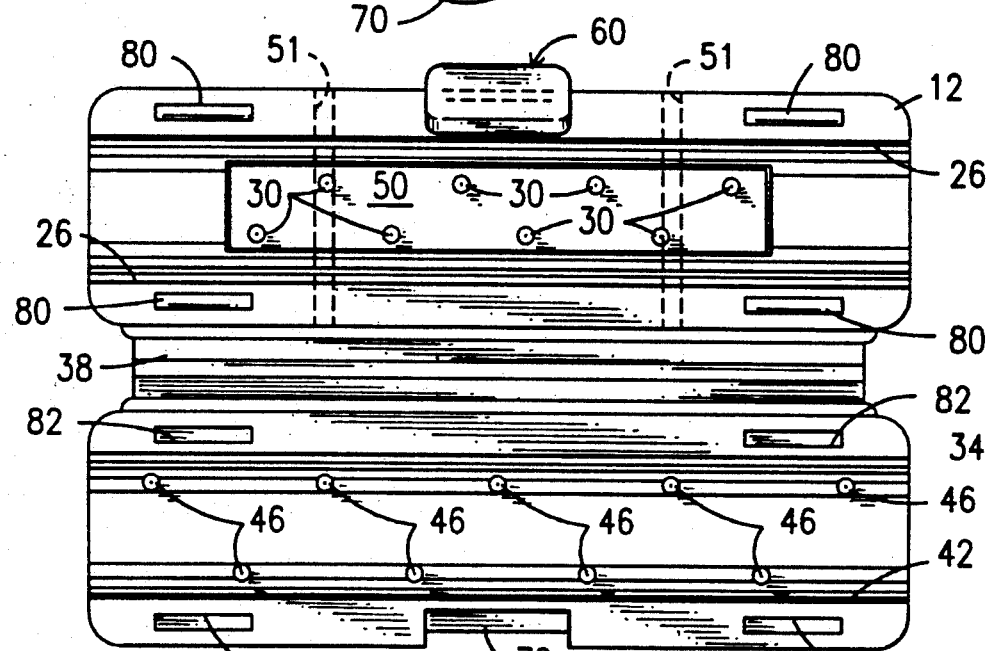
Fig. 7
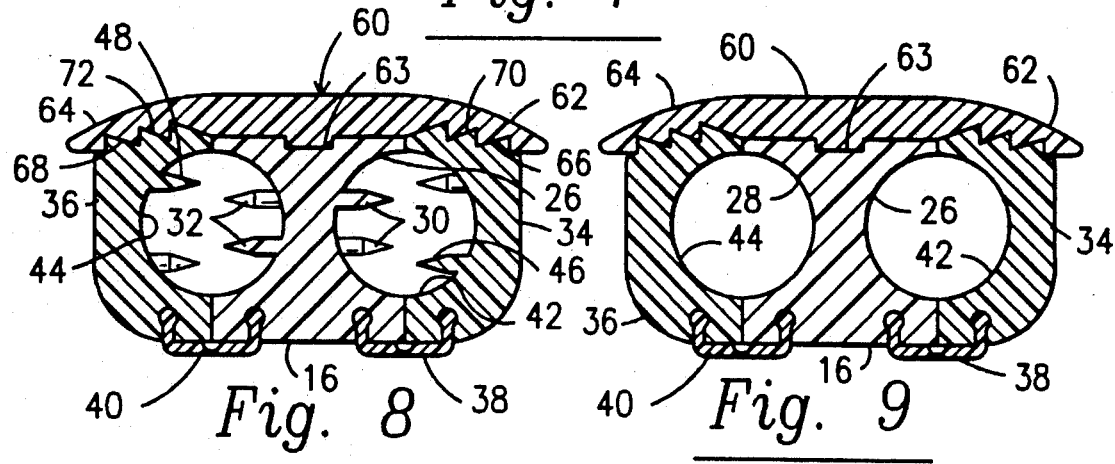
Fig. 8
Fig. 9

ROPE CONNECTOR HAVING QUICK ENGAGING AND RELEASING MEANS

BACKGROUND OF THE INVENTION

1. Field of the Invention

This invention relates, generally, to devices that join ropes together in the absence of knots. More particularly, it relates to a device that joins ropes together in less time and with at least as much holding power as a knot, and that releases said ropes in less time than the time required to untie a knot.

2. Description of the Prior Art

U.S. Pat. No. 5,068,949 to the present inventor represents the most relevant prior art to the present invention. It discloses a rope clamp having two elongate main parts that are hingedly connected to one another. Each part has rows of transversely aligned teeth that engage diametrically opposite sides of a pair of ropes positioned in sandwiched relation therebetween when the clamp is closed. A latch and catch construction holds the clamp in its closed position, and a push button enables quick release of the clamp.

One feature of the earlier design is that opening the clamp releases both ropes simultaneously because the ropes are not positioned in individual compartments; in some situations this is a desireable feature but in some situations it is not.

Devices having some structural similarity to the above-described clamp are shown in U.S. Pat. Nos. 633,632 to Wilson, 3,896,527 to Miller et. al., and 4,594,752 to Garner, Sr.

Still further devices of interest are shown in U.S. Pat. Nos. 1,564,995 to Allen, 2,686,520 to Jarvis et. al., 761,926 to Van Loghem, 4,493,134 to Karr, 4,532,682 to Murao, and 1,365,762 to Zinow.

The art is so well-developed that most rope clamp designers have concluded that further breakthroughs in clamp design will not be achieved. Thus, the invention to be disclosed hereinafter was not obvious at the time it was made to those of ordinary skill in the art in view of the prior art taken as a whole.

SUMMARY OF THE INVENTION

A central base member of elongate construction has an elongate semicircular groove formed in each of its longitudinally extending edges, and a plurality of upstanding spikes are positioned in each of said grooves. Each grooved edge is capped by an elongate closure means in the form of a hingedly mounted cap having a complementally formed semicircular groove formed along its length, and a plurality of upstanding spikes are also positioned in said grooves. Thus, an elongate cylindrical bore is formed at each edge of the base member when the cap associated with each edge is closed. When a rope is positioned in a groove formed in an edge of the base member, the spikes in the base member groove penetrate a first side of said rope. When the associated cap member is closed, the spikes in the cap member penetrate the opposite side of the rope. In this way, a pair of ropes are joined in the absence of a knot by placing a preselected end of each rope into a preselected groove and closing the closure means. Thus, each rope is held in an elongate cylindrical compartment dedicated solely to it, and spikes penetrate the rope from opposite sides thereof so that slippage is virtually impossible.

Each closure means is held in its closed position by a latch and catch arrangement of irreducible simplicity. The medial part of a flat, slightly flexible catch member is fixedly secured to the base member so that its opposite ends extend freely therefrom in opposite directions. Plural teeth are formed on a preselected side of each freely extending end of the catch member, and a latch means having mating teeth formed therein is formed in an outer surface of each of the hingedly mounted caps; the teeth on the latch means thus engage their associated teeth formed on the catch means when each cap is closed, and the ropes held in their respective grooves may not escape therefrom. The latch is unlatched by lifting up on the flexible catch means so that the mating teeth may disengage from one another; the resiliency of the clamped ropes may further open each cap because the ropes may be compressed at least to some extent when their associated cap is closed.

Thus it is understood that a primary object of the present invention is to advance the art of rope clamps by providing a clamp where each rope is held in a compartment dedicated solely to it.

Another important object is to provide a rope clamp that may release one rope while retaining another.

Another major object is to provide a clamp structure that is easy and economical to manufacture.

Still another object is to provide a clamp structure having a simple yet highly effective means for locking and unlocking the ropes within the clamp.

These and other important objects, features and advantages of the invention will become apparent as this description proceeds.

The invention accordingly comprises the features of construction, combination of elements and arangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying, in which:

FIG. 5 is a transverse sectional view like FIG. 3, but with both caps open;

FIG. 6 is an end elevational view of an alternate form of the novel insert member;

FIG. 7 is a side elevational view similar to FIG. 4, but showing a cap in its open position;

FIG. 8 is a transverse sectional view of a second embodiment of the invention; and FIG. 9 is a transverse sectional view of a third embodiment of the invention.

Similar reference numerals refer to similar parts throughout the several views of the drawings.

DETAILED DESCRIPTION OF THE PREFERRED EMBODIMENT

Figure 1:
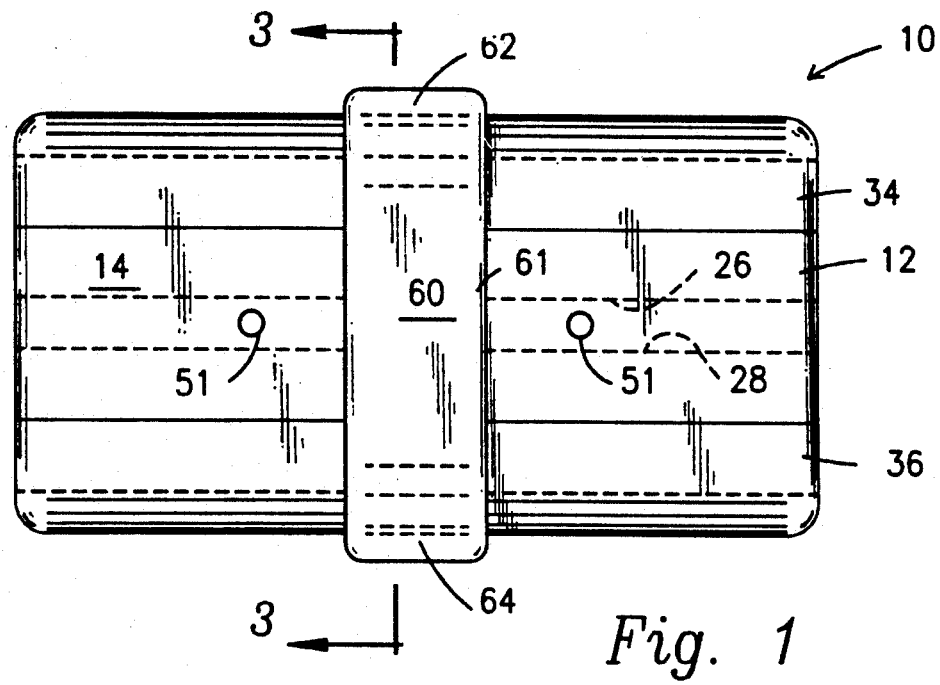
FIG. 1 is a top plan view of an illustrative embodiment of the invention.
Figure 4:
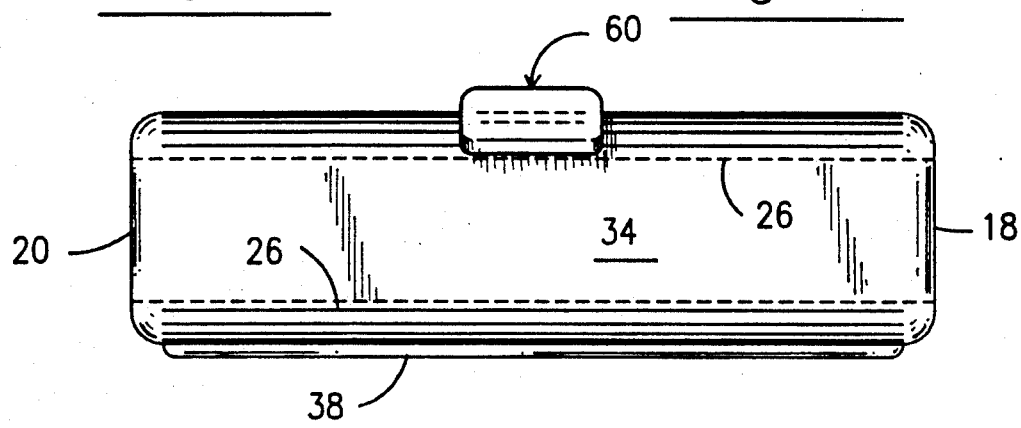
FIG. 4 is a side elevational view thereof.

An exemplary embodiment of the invention is generally denoted by the reference numeral 10 in FIG. 1. As perhaps best shown in FIGS. 2-4, rope clamp 10 includes a solid base member 12 having flat top wall 14, flat bottom wall 16, flat end walls 18, 20, and longitudinally disposed side walls 22, 24 having elongate semicircular grooves 26, 28 formed therein, respectively, and the upstanding spikes mounted in each groove are respectively denoted 30, 32.

Cap members 34, 36 are hingedly connected to opposite sides of base member 10 by hinge means 38, 40, and semicircular grooves 42, 44 are formed in said cap members as depicted. The spikes mounted in grooves 42, 44 are respectively denoted 46, 48. The grooves formed in the base 12 and the grooves formed in the cap members 34, 36 are of similar dimension and curvature so that when the cap members are closed, elongate cylindrical bores are formed; a rope positioned in a preselected bore is penetrated by spikes entering it from opposite directions when the cap associated with that bore is closed.

Figures 2, 3:
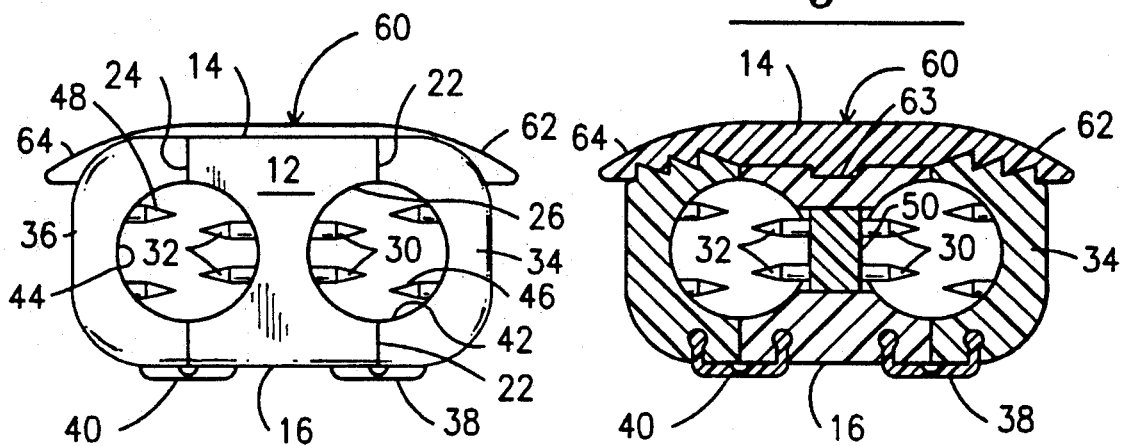
FIG. 2 is an end elevational view thereof.
FIG. 3 is a transverse sectional view taken along line 3—3 in FIG. 1.

The invention is not limited to any particular bore diameter. However, to avoid manufacturing clamps of many differing sizes, a spike-carrying insert member may be positioned within each bore. In FIGS. 3 and 5, such an insert member is denoted 50; note that it is positioned in an opening formed in base member 12 which extends completely therethrough. Insert member 50 may be sized so that its top surface is flush or nearly flush with the cylindrical surface of its associated bore, as shown in FIGS. 3 and 5, or it may be sized so that it protrudes into said bore; the latter would be the case where a rope of small diameter were to be engaged. An insert 52 that would protrude into the bores is depicted in FIG. 6; use of insert 52 would enable clamp 10 to hold ropes of narrower diameter than the clamps of FIGS. 3 and 5.

Note in FIG. 7 that insert 50 is held into position by pins, not shown, that are positioned in transverse bores 51, 51. These bores extend through base member 12 as well, as shown. In an alternative embodiment, not shown, insert 50 is made in two parts, i.e., spikes 30, 32 are carried by separate parts, and each of said separate parts are snap fittingly received within a recess formed in grooves 26, 28, respectively; that arrangement eliminates bores 51, 51 and the pins disposed therewithin.

The unique means for holding each cap 34, 36 in its closed configuration, and the means for quickly releasing said cap members, includes a flat, flexible catch member 60 having a medial part 61 and a pair of free ends 62, 64. Medial part 61 is fixedly secured by suitable means to top wall 14 of base member 12, and the opposite ends 62, 64 of said catch member extend freely from said base member as shown. A recessed keyway 63 may be formed in said base member top wall 14 and a protruding mating key may be formed in the medial part of the catch member to improve the structural integrity of the clamp. Plural transversely disposed teeth 66, 68 are formed in the interior side of each free end. Complementally formed teeth 70, 72 are formed in the outer surface of each cap, mid-length thereof, and said teeth 70, 72 progressively engage teeth 66, 68 as the respective caps are closed. It should be noted that a rope of large diameter, i.e., a rope having a diameter greater then the diameter of the bore defined when a cap is closed, will be progressively compressed as the mating teeth are progressively engaged.

As indicated in FIG. 5 by directional arrows 75, the caps are opened by lifting the free end of the latch so that the teeth may disengage from one another, thereby allowing caps 34, 36 to swing open about their respective hinges 38, 40 in the direction indicated by the directional arrows 77 in FIG. 5. Thus, the rope releasing action is accomplished very quickly and the mechanism for accomplishing such release is reliable, easy to manufacture, and durable.

Note that one rope may be left within the device when the other rope is released therefrom.

Means for aligning the caps and base member when the caps are closed are shown in FIGS. 5 and 7. Protrusions 80, formed in base member 12 at opposite ends thereof on opposite sides of grooves 26, 28, are press fittingly received within corresponding grooves 82 formed in caps 34, 36, as perhaps best understood in connection with FIG. 7.

FIG. 8 shows that insert members 50, 52 may be obviated and that spikes 30, 32 may be mounted directly into their respective grooves 26, 28. FIG. 9 shows that the spikes may be eliminated entirely for applications where the need for strength is less; a rope having a diameter larger than the diameter of its associated bore will be held tightly when its associated cap member is closed, even in the absence of spikes 30, 32, 46, 48. The smooth cylindrical surfaces of the rope-receiving bores could be roughened to enhance the frictional engagement of each rope in this embodiment of the invention.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A clamp that joins together a pair of ropes, comprising:

a base member having a predetermined longitudinal extent;

said base member having a flat top wall, a flat bottom wall, and a pair of longitudinally extending side walls;

a longitudinally extending semicircular groove formed in each of said side walls;

a pair of cap members, each of which has a longitudinal extent substantially equal to the longitudinal extent of said base member;

a pair of hinge members for hingedly connecting said cap members to opposite sides of said base member;

a longitudinally extending semicircular groove formed in each of said cap members;

a cylindrical bore defined by each groove formed in said base member and its associated groove formed in its associated cap member when said cap members are closed;

closure means for independently and releasably holding each of said cap members closed;

an elongate, flexible catch member having a medial part fixedly secured to said base member top wall and a pair of free ends that extend in opposite directions from said medial part;

said catch member disposed in transverse relation relative to a longitudinal axis of said clamp;

a plurality of teeth being formed on a preselected side of each free end of said catch member; and a plurality of complementally formed teeth formed on an outer surface of each of said cap members;

whereby said catch member teeth engage said cap member teeth when said cap members are closed; and whereby lifting a preselected free end of said catch member disengages the teeth formed on said preselected free end and the teeth formed on the outer surface of its associated cap member so that said associated cap member may swing open.

2. The clamp of claim 1, further comprising a first plurality of spikes mounted in each of said grooves formed in said base, and a second plurality of spikes mounted in each of said grooves formed in said cap members.

3. The clamp of claim 2, further comprising a longitudinally-extending opening formed in said base, an elongate insert member of predetermined thickness for slideable insertion into said opening, a plurality of spikes mounted on said insert member on opposite sides thereof, and means for retaining said insert member in said opening.

4. The clamp of claim 3, wherein the predetermined thickness of said at least one insert member is substantially equal to the depth of said opening.

5. The clamp of claim 4, wherein the predetermined thickness of said insert member is greater than the depth of said opening.

6. The clamp of claim 1, wherein said catch member is positioned mid-length of said base member top wall.

7. The clamp of claim 6, wherein the teeth formed in said outer surface of said cap members are formed mid-length thereof.

* * * * *